United States Patent [19]

Ray

[11] Patent Number: 4,805,887

[45] Date of Patent: Feb. 21, 1989

[54] UNIVERSAL VACUUM AND CLAMP SETUP FIXTURE FOR COORDINATE MEASURING MACHINES

[75] Inventor: Larry L. Ray, Flushing, Mich.

[73] Assignee: Rayco Manufacturing, Inc., Auburn Heights, Mich.

[21] Appl. No.: 119,669

[22] Filed: Nov. 12, 1987

[51] Int. Cl.$^4$ .............................................. B25B 11/00
[52] U.S. Cl. ........................................ 269/21; 51/235
[58] Field of Search ................. 269/21, 30, 309, 900; 51/235; 279/3

[56] References Cited

U.S. PATENT DOCUMENTS

| | | | |
|---|---|---|---|
| 2,317,348 | 4/1943 | Wekeman | 269/21 X |
| 2,782,574 | 2/1957 | Copold | 269/21 X |
| 3,520,055 | 7/1970 | Jannett | 269/21 X |
| 4,174,847 | 11/1979 | Wiesler | 269/21 X |
| 4,258,928 | 3/1981 | Wiesler | 269/21 X |
| 4,640,501 | 2/1987 | Poland | 269/21 |
| 4,723,766 | 2/1988 | Beeding | 269/21 |

*Primary Examiner*—Eugene R. LaRoche
*Assistant Examiner*—Robert J. Pascal
*Attorney, Agent, or Firm*—Basile and Hanlon

[57] ABSTRACT

The invention is an appratus for, and the method of clamping flexible items in a fixed position in relation to the measuring probe of a coordinate measuring machine. A perforated rigid plate is attached to the working surface of coordinate measuring machine. One or more hollow, rigid article holders are mated to the plate by use of suitable fastening mechanisms. On the upper end of each hollow support holder for articles is a flexible suction cup. A source of vacuum is provided to the article holders which is directed through the opening of the suction cup. One or more stand-offs or spacers may be installed on the plate as well, to help position a part. A part to be measured is then placed on the article holders and a vacuum is applied. Coding of the position of each of the perforations on the plate allows for easy set-up and reproducibility. The stand-offs or spacers are equipped at one end with a mechanism to allow attachment to the plate, and at the opposing end with a mechanism to allow mating of the stand offs or spacers together, or mating of them with the article holders. In this fashion, the stand-offs or spacers can function to change the height of the article holders in relation to the surface of the plate, and can also function to restrict the movement of the article placed on the invention. The method herein described includes the method of utilizing the features of the invention to affix an article to a accordinate measuring machine with good reliability and reproducibility.

29 Claims, 2 Drawing Sheets

UNIVERSAL VACUUM AND CLAMP SETUP FIXTURE FOR COORDINATE MEASURING MACHINES

FIELD OF THE INVENTION

1. Background of the Invention

This invention relates to an apparatus for, and a method of clamping flexible articles in fixed position in relation to a measuring probe of a coordinate measuring machine. The apparatus is particularly well adapted to reconfiguration to accommodate a wide variety of different parts, with reliable reproducibility in setup and measurement. Such fixture is of particular use in the quality control phase of the article manufacturing process, for determining with precision the integrity of the manufacturing process and the uniformity of mass produced parts, and in particular, the uniformity of mass produced parts which may be subject to flexion when clamped in a conventional fixture.

2. Description of the Prior Art

Modern American industry is developing a wide range of automated factories and automated assembly lines within traditional manufacturing facilities. A key element of automated production in such facilities is the automated inspection process. To achieve the goal of production of mass produced parts at minimal cost while assuring quality control, automated inspection equipment for individual component parts has come into wide use. Typically, representative samples of the product of the article manufacturing process are measured in sophisticated, computerized or automated measuring equipment to ensure that the completed parts are within the required tolerances. Automated inspection equipment is also used in conjunction with computers, to provide machine controls, statistical analysis and the collection of data. In modern applications, quality control data is collected in automated coordinate measuring machines.

Typically, automated inspection equipment, taking the form of coordinate measuring machines, utilizes a fixed work surface, often of substantial mass, and a corresponding framework to allow contact or non-contact sensors to measure the dimensions of an article placed on the work surface. However, to ensure good reproducibility in measurement, the article so measured must be carefully clamped in a predefined position on the coordinate measuring machine. The article must be precisely oriented in all three axes and, in addition, must be located in the appropriate relationship to the height of the mounting platform.

Previously, good reproducibility in coordinate measuring equipment was assured when the article being measured was relatively inflexible, e.g., a connecting rod for a piston engine; and where rugged secure mechanical clamps were used. These clamps are created with elaborate tooling requirements, to ensure precise placement of the article in relation to the measuring probes. These requirements, however, severely limited the versatility of coordinate measuring equipment.

First, the setup of coordinate measuring equipment for a wide variety of articles requires the creation of a similarly wide variety of clamping devices and jigs to ensure proper holding and positioning of the articles in relation to the sensors. Each article accordingly required customized clamping components. Moreover, the clamping forces required are relatively high, creating serious problems in the fixing process for measuring flexible parts. Even apparently stiff sheet metal parts exhibit measurable degrees of flexion when clamped in traditional setup fixtures, creating variable measurements for the same part. This leads to high degrees of error. Further, the clamping forces and security required for even relatively solid articles dictate the use of work surfaces of enormous mass.

The present invention, by utilizing multiple vacuum clamps, solves all of the foregoing difficulties and provides a high degree of reliability and flexibility in the establishment of a clamping fixture for coordinate measuring equipment.

SUMMARY OF THE INVENTION

The present invention provides a method and apparatus designed to satisfy the aforedescribed needs. Through the utilization of a perforated plate and removable and relocatable vacuum clamp holders, a wide variety of clamping configurations can be created on a stable planar surface, allowing the same clamp setup fixture to be reused in multiple configurations for a variety of parts. A vacuum source directs vacuum to the removable holders which are in turn equipped with flexible suction cup clamps which exert minimum distortional loads on the clamped articles. The perforations contained in the planar surface are systematically arrayed and labeled so as to easily re-establish a particular clamping configuration.

DESCRIPTION OF THE PREFERRED EMBODIMENT

Figure 1:
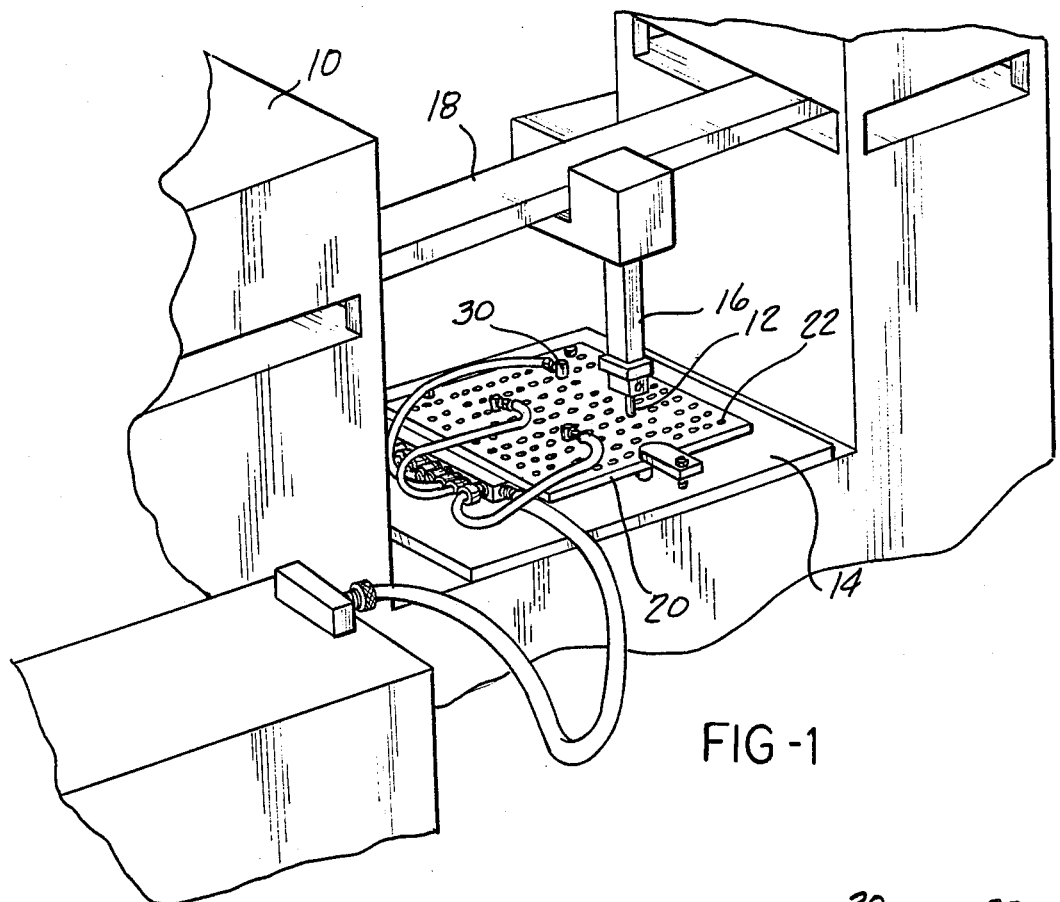
FIG. 1 is a perspective view depicting the universal vacuum and clamp setup fixture in place on a stylized commercial coordinate measuring machine.

Referring now to FIG. 1, a coordinate measuring machine 10 is shown. The machine 10 includes one or more contact probes 12 which sense the surface of an article as shown, and an article supporting surface 14, as well as an article sensing probe arm 16 and supporting hardware 18. The coordinate measuring machine 10 may be of any commercially available type, and may incorporate non-contact sensing means, as well as a wide variety of systems for location, relocation, mounting, dismounting and movement of the sensor. In addition, the coordinate measuring machines are typically equipped with data processing input and output devices, as well as devices for the movement of the measuring sensors in relation to the article mounted on the mounting surface of the machine.

In the preferred embodiment, a plate 20 is secured to the article supporting surface 14 of a typical coordinate measuring machine 10. The plate is secured to the surface by a suitable means, and is typically constructed of steel of sufficient thickness so as to render it nominally inflexible in relation to the measuring capability of the machine. In this manner, the mounting surface so established for subsequent positioning of article holding means may be considered as a fixed datum in relation to the affixed datum of the coordinate measuring machine's original article mounting base. The plate so mounted is arrayed with multiple article mounting cavities 22 which are organized in an orderly fashion.

Figure 2:
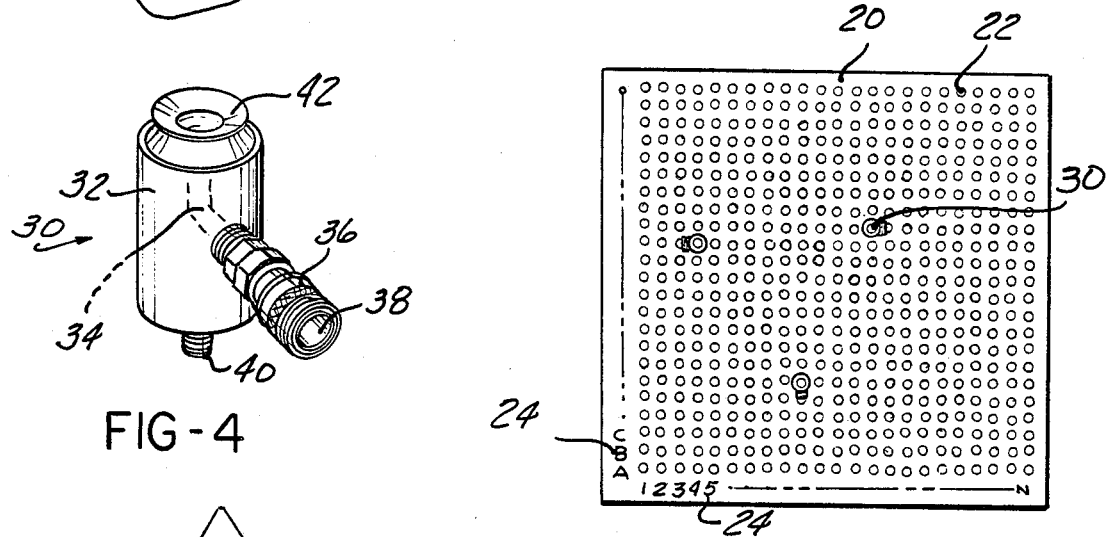
FIG. 2 is a top view of the vacuum and clamp setup fixture showing multiple vacuum holders in place.

With reference to FIG. 2, in the preferred embodiment, the array of cavities 22 consists of a series of rows and columns oriented in precise relation to one another, so that the geometric center of each row of cavities is precisely aligned in a straight line, and that each row of columnar cavities is likewise aligned, and an imaginary line connecting the centers of the cavities of any particular row is precisely perpendicular to an imaginary line connecting the centers of any particular column. In addition, each column in each row is embossed with an identifying symbol 24, for example, columns may be identified with capital Arabic leters, while rows may be identified with standard numerals, thereby allowing precise identification of the location of any particular article holder location by a letter and number, for example, B2. Notwithstanding this preferred embodiment, similar organized, relational methods of identifying any location on the plate may be utilized, including the use of a radial measuring system, whereby the location of any mounting cavity can be determined by its radial variation from a fixed zero degree reference radial, and by the distance of said cavity from the center of the radial grid. In addition, a preselected may of known positions may be utilized as reference points, and accessed by a computer program having a corresponding map of each position.

Figure 4:
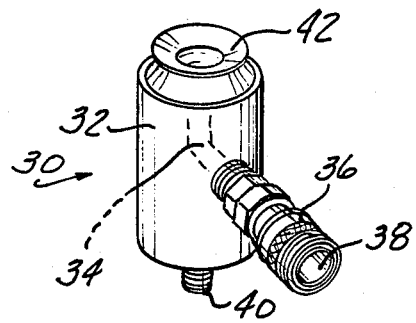
FIG. 4 is a perspective view of the article holder, showing its component parts.
Figure 3:
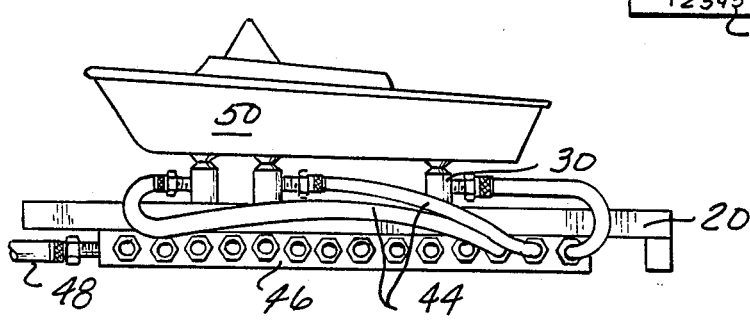
FIG. 3 is a front elevation of the clamp setup fixture showing the setup fixture plate and vacuum holders in position, together with the vacuum hoses and the associated manifold.

With reference to FIG. 3 the cavities in the plate are machined of a dimension to accept by precise fit, one article holder 30. Each article holder is of sufficient vertical height to protrude above the surface of the plate 20. Aside from this limitation, article holders may be of any shape and size. Article holders are also equipped with a passageway and a receptacle for accepting a vacuum source. In the preferred embodiment, the article holder body (32) is roughly cylindrical in shape, as shown in FIG. 4 and contains a cavity 34 which is open at the top and communicates with a vacuum fitting 36 on the body to one side or at the bottom. The vacuum fitting opening 38 is oriented so as to allow access to the vacuum fitting when the holder is mounted in the plate 20. The holder may be secured to the plate by a variety of means, including a threaded fastener 40. Once mounted in the plate, the article holding means may be connected, through the vacuum source opening to a manifold 46 and then a source of vacuum 48, thereby creating a vacuum or low pressure area within the cavity 34 portion of the holder.

In the preferred embodiment, each holder is equipped with a flexible suction cup 42, mounted on the end of the holder body 32 opposite the plate 20. The suction cup is preferably flexible, to allow the suction surface of the cup to be varied in axis from the horizontal, to allow good contact with irregularly shaped parts.

In the preferred embodiment, one or more holders 30 are mounted to the plate 10 in prearranged positions, corresponding to prearranged clamping points on an article 50 to be measured. The prearranged clamping points are identified by the coding system on the grid of the plate. The article 50 to be measured is thereafter placed on the article holders 30, and a vacuum source 48 is applied through the manifold 46 to vacuum hoses 44 with connecting the manifold 46 to each holder 30. The vacuum so applied firmly secures the article to the holders, without applying excessive distorting forces. Thereafter, the coordinate measuring machine sensors probe the surface of the article. After the measurements are taken, the article 50 may be easily removed from the holders 30 by removing the vacuum source, and additional articles may be so mounted on the plate in a similar fashion. When a new article of different dimension is to be measured, the article holders may be relocated to different positions on the plate accordingly, and additional article holders may be added or article holders present may be deleted.

Figure 5:
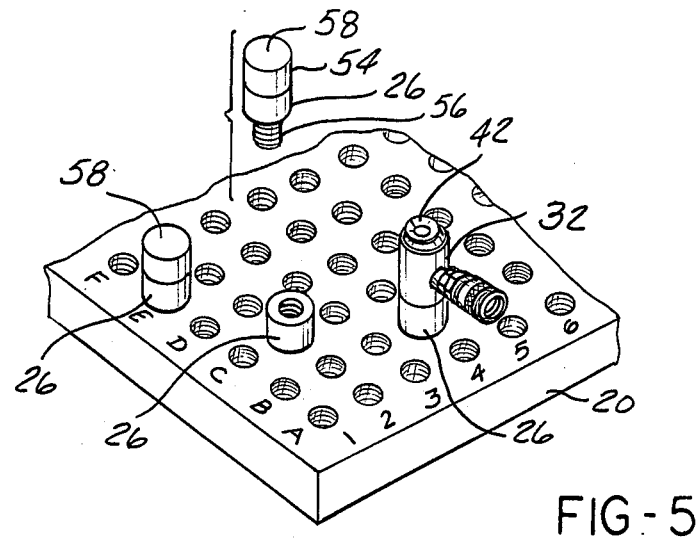
FIG. 5 is a perspective view of the vacuum and clamp setup fixture showing an alternate coding arrangement and position of the cavities in the fixture.
Figure 6:
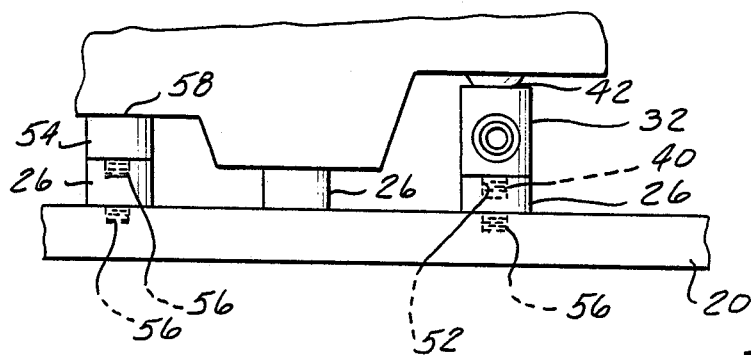
FIG. 6 is a side elevational view of FIG. 5.

Referring now to FIGS. 5 and 6, the utilization of the stand-off 26 is depicted. The stand-offs, 26, are provided in varying lengths. Each stand-off 26 is manufactured with means to install it on the plate 20. This mounting means may consist of a threaded shaft 56. The oppose end of each stand-off is equipped with a mating attachment feature, corresponding exactly to the attachment means first provided. For example, if a stand-off is equipped with a threaded shaft, at one end, suitable for engaging a threaded opening in the plate 20, then the opposite end of the stand-off is preferably equipped with a threaded cavity 52 of corresponding size, thereby allowing multiple stand-offs to be attached end-to-end, thereby creating stand-offs of varying heights. In another embodiment, the standoffs 54 or spacers are equipped with differing attachment means, for example, a threaded shaft 56 on one end, and a magnetic 58 or bayonet-type mount on the other.

In still another embodiment, the stand-offs are placed at appropriate positions on the plate so as to limit the lateral movement of the article being supported. As an example, a regularly shaped article may be preliminarily placed in position on the invention by first mounting a plurality of stand-offs in suitable locations on the plate 20, so as to define an approximate outline of the cross section of the article at its largest dimension.

In still another embodiment, the plate 20 takes the form of a non-planar surface, for example, a hemisphere. In this manner, a hemispherical item may be more securely held then would otherwise be possible using a flat plate and multiple stand-offs. Likewise, the supporting plate 20 may take the form of an irregularly shaped or custom designed surface, which may have multiple indentations and contours.

Having thus described my invention in detail, it will be obvious to those skilled in the art that numerous modifications may be made to the invention herein disclosed, without departing from the invention herein claimed.

I claim:

1. An apparatus for securing articles relative to a work surface comprising:
    (A) a rigid surface disposed in a fixed position relative to said work surface;
    (B) a plurality of cavities disposed on said rigid surface;
    (C) at least one article holder having an inlet opening, an outlet opening, a flexible suction cup mated to said outlet opening and means for removably securing said article holder in a fixed position in one of said cavities;
    (D) a vacuum source; and (E) means for coupling said vacuum source to said inlet opening of each article holder.

2. The apparatus of claim 1, wherein said cavities are disposed as a series of rows and columns identified by letter and number, respectively.

3. The apparatus of claim 1, wherein said cavities are disposed as a series of radial rows disposed axially around a center reference point on said rigid surface.

4. The apparatus of claim 1, wherein at least one said cavity contains an identifying symbol.

5. An apparatus for securing articles relative to a coordinate measuring machine comprising:
(A) a generally planar surface disposed in a fixed position relative to the coordinate measuring machine, and having a plurality of cavities therein;
(B) at least one article holder having an inlet opening, an outlet opening, a flexible suction cup mated to said outlet opening and means engaging one of the cavities for removably securing said article holder in a fixed position on said planar surface;
(C) a vacuum source; and
(D) means for coupling said vacuum source to said inlet opening of each article holder.

6. The apparatus of claim 5, wherein said means for coupling said vacuum source to said inlet opening of each article holder further comprises a quick disconnect fitting.

7. The apparatus of claim 5, wherein said means for removably securing said article holder in a fixed position to said planar surface further comprises means for removably mounting said article holders in are of said cavities on said surface.

8. The apparatus of claim 5, wherein said cavities are disposed as a series of rows and columns identified by letter and number, respectively.

9. The apparatus of claim 5, wherein said cavities are disposed as a series of radial rows disposed axially around a center reference point on said planar surface.

10. The apparatus of claim 5, wherein at least one said cavity is identified by a symbol.

11. The apparatus of claim 5, which further comprises a plurality of rigid spacers, means for attaching said spacers to said planar surface and further comprising means to connect said spacers to each other as well as to said article holder.

12. A method of securing articles to a work surface comprising the steps of:
(A) securing to said work surface a rigid surface containing at least one cavity;
(B) removably securing to said cavity at least one hollow cylindrical article holder in a fixed position;
(C) connecting said at least one article holder to a source of vacuum;
(D) placing said article on said article holder; and
(E) supplying sufficient vacuum to said at least one article holder to secure said article to said at least one article holder by virtue of said vacuum.

13. The method of claim 12, wherein each said hollow cylindrical article holder is equipped with a flexible suction cup, thereby creating a displaceable surface to be articulatable in the contours of said article.

14. The method of claim 12, which further comprises the steps of coding by appropriate character, the position of each cavity in said rigid surface.

15. The method of claim 12, which further comprises the steps of removably affixing rigid spacers to said rigid surface.

16. A method of securing articles to a coordinate measuring machine comprising the steps of:
(A) securing to said coordinate measuring machine a generally planar surface, said generally planar surface containing at least one cavity;
(B) removably securing to said cavity at least one hollow cylindrical article holder in a fixed position;
(C) connecting said at least one hollow cylindrical article holder to a source of vacuum;
(D) placing said article on said at least one article holder; and
(E) supplying sufficient vacuum to said at least one article holder to secure said article to said at least one article holder by virtue of said vacuum.

17. The method of claim 16, wherein each said hollow cylindrical article holder is equipped with means for removably securing said article holder in at least one said cavity.

18. The method of claim 16, wherein each said hollow cylindrical article holder is equipped with a flexible suction cup, thereby creating a displaceable surface to be articulatable in the contours of said article.

19. The method of claim 16, which further comprises the steps of coding by appropriate characters the position of each cavity in said planar surface.

20. The method of claim 16, which further comprises the step of removably affixing rigid spacers to said planar surface.

21. An apparatus for individually securing a variety of articles in relation to a work station for inspecting predetermined points on a selected article, the apparatus comprising:
rigid surface means secured to said work station for supporting said selected article to be inspected;
fixed locating means for identifying a plurality of positions on said rigid surface means;
article holder means for releasably holding said selected article at predetermined distances spaced from said rigid surface means; and
means for removably securing each individual article holder means at a selected identified position on said rigid surface means, wherein each individual article holder means is individually removable from said rigid surface means and individually relocatable on said rigid surface means at selected identified positions on said rigid surface means chosen to correspond to said selected article to be held and inspected.

22. The apparatus of claim 21 further comprising:
stand-off means for limiting lateral movement of selected article with respect to said rigid surface means; and
means for removably securing each individual stand-off means at a selected identified position on said rigid surface means allowing relocation of each individual stand-off means to a selected position chosen for each different article to be inspected.

23. The apparatus of claim 21, further comprising:
said means including a plurality of threaded apertures in said surface means for removably securing; and
said fixed locating means including each threaded aperture having a unique identifying labeled position.

24. The apparatus of claim 23, wherein the means for removably securing further comprises:
each individual article holder means having a threaded portion engageable with any one of said plurality of apertures.

25. The apparatus of claim 21, wherein the article holder means comprises:
- an article holder having a flexible suction cup engageable with said selected article and vacuum passage means through said article holder in communication with said flexible suction cup; and
- a source of vacuum connectable with said vacuum passage means.

26. The apparatus of claim 25, wherein the vacuum passage means comprises:
- a releasable vacuum fitting connected to the article holder; and
- a flexible vacuum hose connectable with said releasable vacuum fitting between said source of vacuum and said article holder.

27. The apparatus of claim 21, further comprising:
- stackable spacer means for varying the distance of said article holder means from said rigid surface means.

28. The apparatus of claim 22, further comprising:
- stackable spacer means for varying the distance of said stand-off means from said rigid surface means.

29. An apparatus for individually securing a variety of articles in relation to a coordinate measuring machine having a sensing probe for measuring predetermined points on a selected article, the apparatus comprising:
- rigid surface means secured to said coordinate measuring machine for supporting said selected article in relation to said article sensing probe, said rigid surface means having a plurality of fixed threaded apertures, each threaded aperture having a unique coded position for identifying a fixed position on said rigid surface means;
- a plurality of article holders for releasably holding said selected article at predetermined distances spaced from said rigid surface means, each article holder having a threaded portion engageable with any one of said plurality of threaded apertures in said rigid surface means, a flexible suction cup engageable with said selected article, a vacuum passageway through said article holder in communication with said flexible suction cup at one end, and a releasable vacuum fitting connected to the article holder in communication with another end of said vacuum passageway, said threaded portion allowing relocation of each individual article holder for threaded engagement with one of said plurality of threaded apertures in said rigid surface means, said one threaded aperture at a selected and identified position chosen corresponding to the selected article to be held and measured;
- a plurality of stand-offs for limiting lateral movement of said selected article disposed at selected identified positions on said rigid surface means, each individually removable from said rigid surface means and individually relocatable on said rigid surface means allowing relocation of each individual stand-off to selected positions chosen for each different article to be positioned and measured;
- a source of vacuum; and
- a flexible vaccum hose connectable with said releasable vacuum fitting between said source of vacuum and said article holder.

* * * * *